US012643674B2

(12) United States Patent
Douthitt et al.

(10) Patent No.: US 12,643,674 B2
(45) Date of Patent: ***Jun. 2, 2026

(54) FLIGHT RECORDER SYSTEM AND METHOD

(71) Applicant: GE Aviation Systems LLC, Grand Rapids, MI (US)

(72) Inventors: Brian L. Douthitt, Holland, MI (US); Christopher Robert Eckert, East Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,325

(22) Filed: Mar. 25, 2024

(65) Prior Publication Data

US 2024/0270407 A1    Aug. 15, 2024

Related U.S. Application Data

(63) Continuation of application No. 17/338,847, filed on Jun. 4, 2021, now Pat. No. 11,970,286.

(51) Int. Cl.
*B64D 45/00* (2006.01)
*H04L 12/40* (2006.01)

(52) U.S. Cl.
CPC .............. *B64D 45/00* (2013.01); *H04L 12/40* (2013.01); *B64D 2045/0065* (2013.01); *H04L 2012/4028* (2013.01)

(58) Field of Classification Search
CPC . B64D 45/00; B64D 2045/0065; H04L 12/40; H04L 2012/4028
See application file for complete search history.

(56) References Cited

U.S. PATENT DOCUMENTS

| | | | |
|---|---|---|---|
| 6,600,963 B1 | 7/2003 | Loise et al. | |
| 7,983,809 B2 | 7/2011 | Kell et al. | |
| 8,769,127 B2 | 7/2014 | Selimis et al. | |
| 9,542,180 B2 | 1/2017 | Angus et al. | |
| 9,738,398 B1 * | 8/2017 | Wang ..................... | G01S 1/725 |
| 10,255,420 B2 | 4/2019 | Anthony et al. | |
| 10,319,240 B2 | 6/2019 | Beernaert | |
| 10,706,642 B2 | 7/2020 | Throop et al. | |
| 10,713,859 B1 * | 7/2020 | McZeal, Jr. ............. | G01S 19/17 |

(Continued)

FOREIGN PATENT DOCUMENTS

| | | |
|---|---|---|
| CN | 106878371 A | 6/2017 |
| CN | 111367240 A | 7/2020 |

(Continued)

*Primary Examiner* — Luat Phung
(74) *Attorney, Agent, or Firm* — McGarry Bair PC

(57) ABSTRACT

A flight recorder system of an aircraft includes a resource controller module (RCM) communicatively coupled, via a switch fabric, to a set of flight recorder system modules (FRM). Each FRM comprises a respective control module, a respective local memory, and a respective set of input and output (I/O) ports communicatively coupled to the switch fabric. The RCM is configured to detect a respective FRM coupled to the switch fabric, and based on the detection, configure an operation of the FRM, and wherein the respective local memory of the FRM is readable by the RCM, and shareable with the other FRMs via the switch fabric.

6 Claims, 3 Drawing Sheets

(56)     References Cited

U.S. PATENT DOCUMENTS

| | | | |
|---|---|---|---|
| 2006/0200278 A1* | 9/2006 | Feintuch ................ | G05B 9/03 |
| | | | 701/1 |
| 2011/0241916 A1 | 10/2011 | Fletcher et al. | |
| 2012/0203401 A1 | 8/2012 | Dunsdon et al. | |
| 2016/0036513 A1* | 2/2016 | Klippert ................ | H04W 4/40 |
| | | | 455/15 |
| 2016/0154642 A1 | 6/2016 | Mason et al. | |
| 2016/0176538 A1* | 6/2016 | Bekanich ................ | G08G 5/21 |
| | | | 701/14 |
| 2016/0318616 A1* | 11/2016 | Fischer ................ | B64D 25/20 |
| 2017/0018125 A1* | 1/2017 | Jover ................ | G07C 5/02 |
| 2017/0134893 A1 | 5/2017 | Moyer et al. | |
| 2017/0251096 A1* | 8/2017 | Koepke ................ | B64D 45/00 |
| 2017/0289189 A1 | 10/2017 | Bush et al. | |
| 2018/0232970 A1* | 8/2018 | Satyanarayana ....... | B64D 45/00 |
| 2020/0313818 A1 | 10/2020 | Wu | |
| 2021/0107679 A1 | 4/2021 | Dunning et al. | |
| 2022/0014598 A1* | 1/2022 | Decker ................ | H04L 67/56 |
| 2022/0068042 A1* | 3/2022 | Sundareswara ........ | G07C 5/006 |
| 2022/0388675 A1 | 12/2022 | Douthitt et al. | |

FOREIGN PATENT DOCUMENTS

| | | | |
|---|---|---|---|
| CN | 112640546 A | 4/2021 |
| EP | 3002679 A1 | 4/2016 |
| FR | 2841999 B1 | 9/2004 |
| FR | 2916068 B1 | 11/2009 |
| KR | 102177603 B1 | 11/2020 |
| WO | 2009085476 A1 | 7/2009 |

* cited by examiner

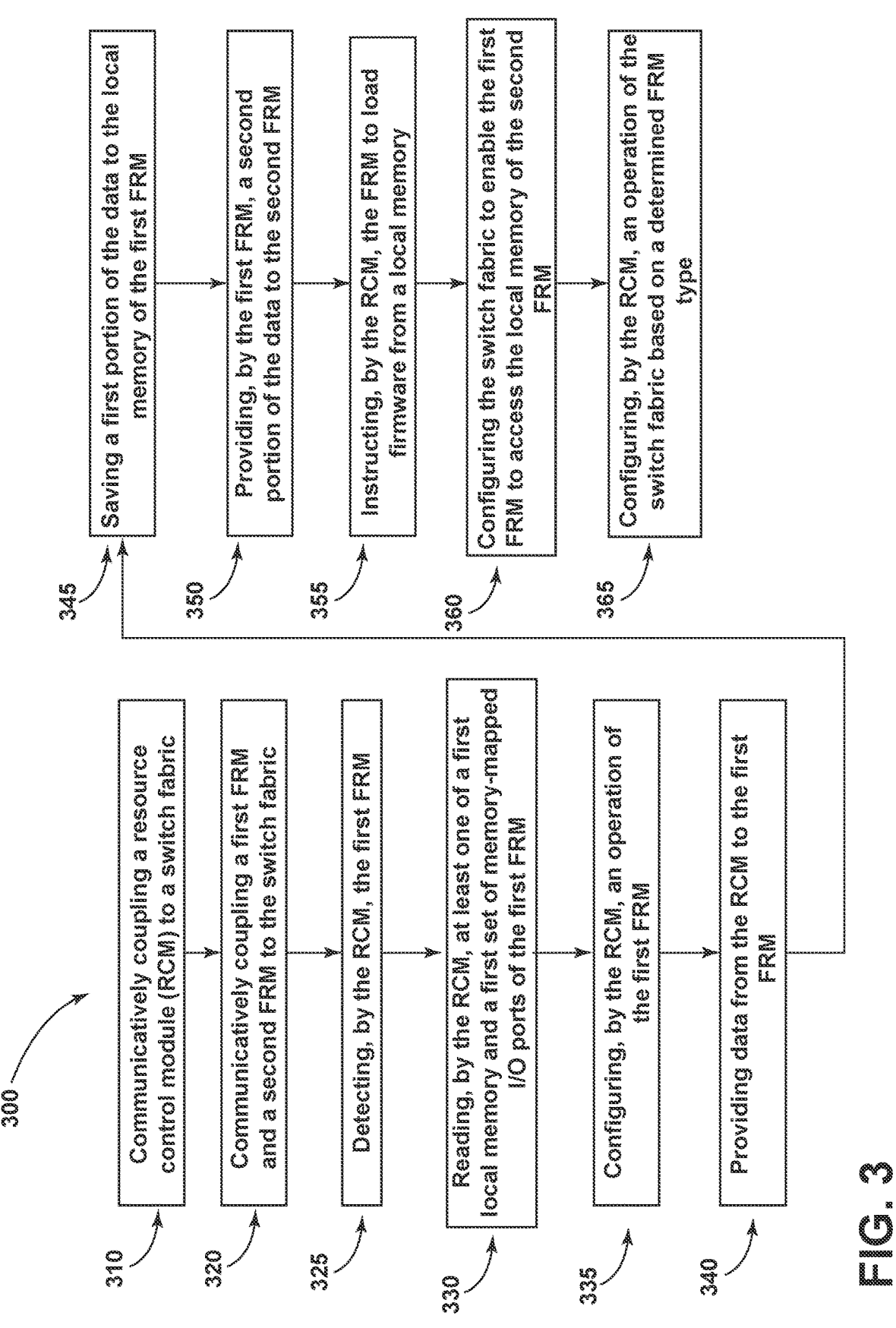

Saving a first portion of the data to the local memory of the first FRM — 345

Providing, by the first FRM, a second portion of the data to the second FRM — 350

Instructing, by the RCM, the FRM to load firmware from a local memory — 355

Configuring the switch fabric to enable the first FRM to access the local memory of the second FRM — 360

Configuring, by the RCM, an operation of the switch fabric based on a determined FRM type — 365

Communicatively coupling a resource control module (RCM) to a switch fabric — 310

Communicatively coupling a first FRM and a second FRM to the switch fabric — 320

Detecting, by the RCM, the first FRM — 325

Reading, by the RCM, at least one of a first local memory and a first set of memory-mapped I/O ports of the first FRM — 330

Configuring, by the RCM, an operation of the first FRM — 335

Providing data from the RCM to the first FRM — 340

FLIGHT RECORDER SYSTEM AND METHOD

CROSS REFERENCE TO RELATED APPLICATION(S)

This application is a continuation and claims priority to and benefit of U.S. patent application Ser. No. 17/338,847, filed Jun. 4, 2021, now issued as U.S. Pat. No. 11,970,286, which is incorporated herein in its entirety.

TECHNICAL FIELD

This disclosure relates generally to aircraft flight recorders, and more specifically to a flight recorder system and a method of operation of a flight recorder.

BACKGROUND

Flight recorders such as aviation cockpit voice and flight data recorders (sometimes called 'black box' recorders) are used to acquire and store information about the operation and status of an aircraft during a flight. This information can be analyzed in response to an unexpected event or accident involving the aircraft. Flight recorders are installed on certain aircraft, typically large or passenger carrying aircraft, and conform to international aviation authority standards. For example, flight recorders are mandated for commercial aircraft by the Federal Aviation Administration (FAA) in the United Stated (U.S.), and the European Union Aviation Safety Agency (EASA) in the European Union, Typically, the flight recorders used in large commercial aircraft continually monitor the current operating conditions and performance of the aircraft via a large number of sensors located around the aircraft. Data from these sensors can be fed into a flight data acquisition unit (FDAU) which provides the data to the flight data recorder. Some sensor data can also be provided directly to the flight recorder. Typical examples of information stored on the flight data recorder include position, speed, altitude, engine speed and rudder position, however modern flight data recorders can often track, store, and analyze hundreds of parameters.

BRIEF DESCRIPTION

An aspect of the present disclosure relates to a flight recorder system of an aircraft. The flight recorder system can include a resource controller module (RCM) communicatively coupled, via a data communication network defining a switch fabric, to a set of flight recorder system modules (FRM). Each FRM can comprise a respective control module, a respective local memory, and a respective set of input and output (I/O) ports communicatively coupled to the switch fabric. The RCM is configured to detect a respective FRM coupled to the switch fabric, and based on the detection, configure an operation of the FRM, and wherein the respective local memory of the FRM is readable by the RCM, and shareable with the other FRMs via the switch fabric.

In another aspect, the disclosure relates to a method of operating a flight recorder system of an aircraft, the flight recorder system including a first flight recorder module (FRM) having a first local memory and a first set of memory-mapped I/O ports and a second FRM, having a second local memory and a second set of memory-mapped I/O ports. The method includes communicatively coupling a resource control module (RCM) to a switch fabric, communicatively coupling the first FRM and second FRM to the switch fabric, detecting, by the RCM, the first FRM, reading, by the RCM, at least one of the first local memory and the first memory-mapped I/O ports of the first FRM, configuring, by the RCM, an operation of the first FRM, providing data to the first FRM, saving a first portion of the data to the local memory of the first FRM, and retrieving, by the second FRM, a second portion of the data from the first FRM to the second FRM.

BRIEF DESCRIPTION OF THE DRAWINGS

A full and enabling disclosure of the present description, including the best mode thereof, directed to one of ordinary skill in the art, is set forth in the specification, which refers to the appended FIGS., in which:

FIG. 3 is a flow chart diagram illustrating a method of operating a flight recorder system in accordance with aspects described herein.

DETAILED DESCRIPTION

Figure 1:
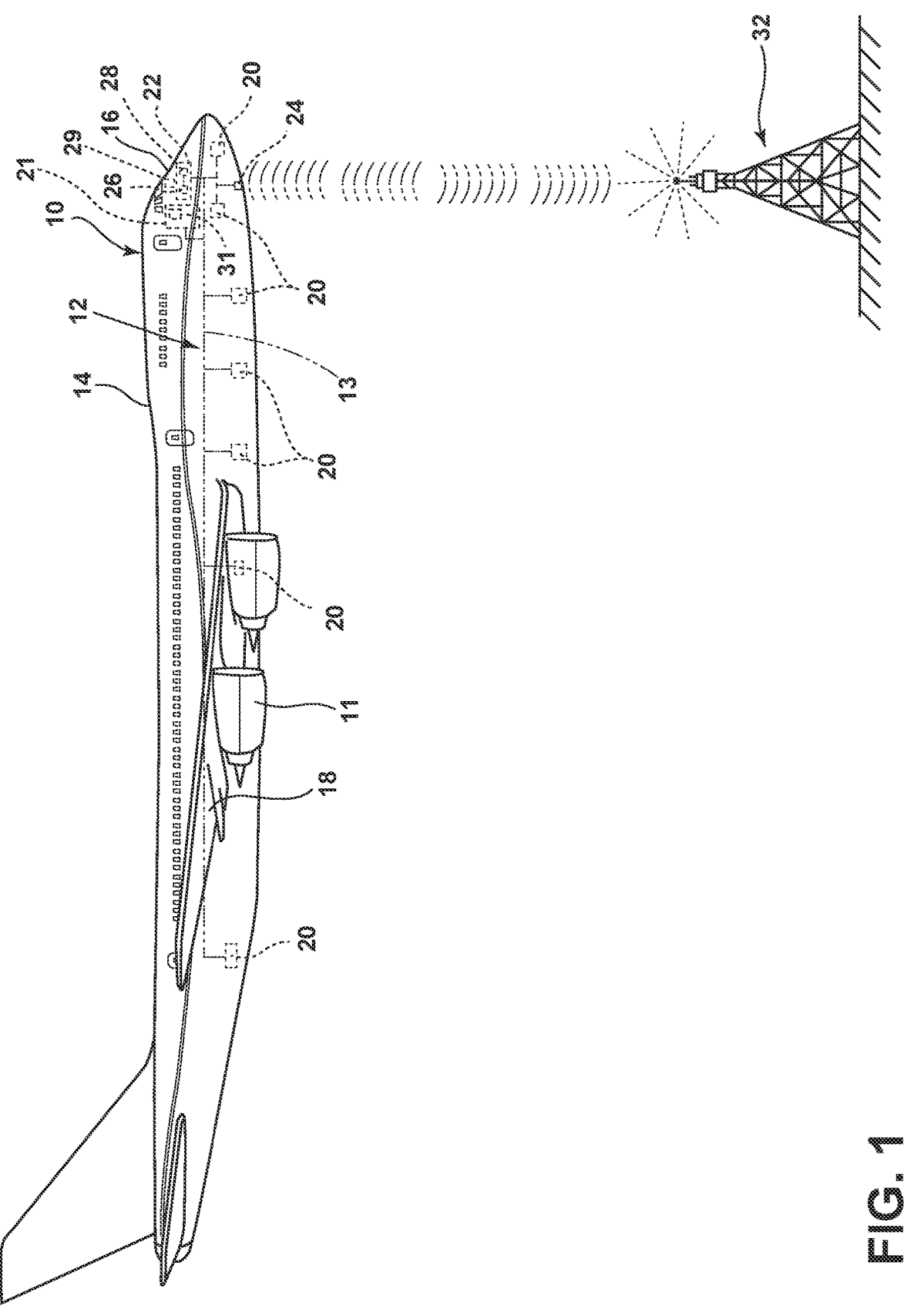
FIG. 1 is a schematic illustration of an aircraft and ground system in accordance with aspects described herein.

For purposes of illustration and discussion, the present disclosure will be described with respect to a flight recorder system for an aircraft. It will be understood that the disclosure can have applicability in other vehicles or systems, and can be used to provide benefits in industrial, commercial, and residential applications that use or require recorded data.

The exemplary drawings are for purposes of illustration only and the dimensions, positions, order and relative sizes reflected in the drawings attached hereto can vary.

As used herein, all directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements. Furthermore, as used herein, the term "set" or a "set" of elements can be any number of elements, including only one.

As used herein, a "controller" or "controller module" can include a component configured or adapted to provide instruction, control, operation, or any form of communication for operable components to affect the operation thereof. A controller module can include, without limitation, any known processor, microcontroller, System-on-Chip (SoC), or logic devices. Such logic devices can include but are not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (PC), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof.

Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. As used herein, the terms "program code" "software", and "firmware" can be used interchangeably, and can be used to describe operable or executable instruction sets that can include routines, programs, code, bit streams, objects, components, data structures, algorithms, etc., that have the technical effect of performing particular tasks or implementing particular abstract data types. When implemented in software or firmware, various aspects as described herein can include code segments or instructions that perform the various tasks. It should be appreciated that the various block components shown in the figures can be realized by any number of hardware, software, or firmware components, or combinations thereof, configured to perform the specified functions.

In another non-limiting example, a controller module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Flight recorder devices are typically electronic recording devices or modules installed in an aircraft to facilitate the investigation of aviation accidents and incidents. The flight recorder devices can include a set of fixed aircraft components, such as a set of line-replaceable units (LRUs). Typically, the flight recorder LRU can comprise a combined cockpit voice and flight data recorder with an integrated crash survivable recording subsystem. Alternatively, the flight recorder LRU can comprise a flight data acquisition unit that receives and processes audio and flight data, and a separate LRU containing the crash survivable recording subsystem. Flight recorder devices can typically include a flight data recorder (FDR) which saves or stores data relevant to the recent history of a flight by recording of dozens of parameters collected several times per second. For example, during normal flight operations, the FDR captures specific aircraft performance parameters such as airspeed, altitude, vertical acceleration, time, nose heading, steering wheel position, rudder pedal position, steering wheel position, horizontal stabilizer, and fuel flow. Flight recorder devices can also include a cockpit voice recorder (CVR) which saves the recent history of the sounds in the cockpit during a flight, including conversations between ground controllers and aircraft crew. The FDR and CVR devices can be combined into a single unit. The FDR and CVR can include an electronic interface and a housing that encloses each circuit, and can include a crash survivable memory unit (CSMU). The CSMU typically includes has a non-volatile memory for storing flight data and voice data. Other flight recorder devices or modules such as data analytics modules (DA) can be arranged to receive flight data corresponding to various predetermined flight parameters from various devices including other flight recorder modules in the flight recorder system, and can include a dedicated processor to perform an analysis of the data. The analysis can be conducted during flight by the DA, or post-flight. Flight recorder devices can include any number of devices or modules configured to capture data indicative of any desired number of parameters relative to the aircraft, including detected, measured, sensed, calculated, derived, or otherwise determined data.

FIG. 1 depicts an aircraft 10 that provides an environment for different aspects of the disclosure. The aircraft 10 can fly a route from one location to another (i.e., a flight) and can include one or more propulsion engines 11 coupled to a fuselage 14. A cockpit 16 can be positioned in the fuselage 14 and wing assemblies 18 can extend outwardly from the fuselage 14. Further, a set of aircraft systems 20 that enable proper operation of the aircraft 10 can be included as well as a controller or computer 22, and a communication system having a communication link 24. A first user interface is illustrated, by way of non-limiting example, as a display 29 that is communicatively coupled to or formed with the computer 22. The display 29 can be any user interface, screen, or known computer system or combination or computer systems that can communicate or otherwise provide an output to one or more users (e.g., a pilot) of the computer 22. It is contemplated that the display 29 can also obtain or receive input from the one or more users of the computer 22. In non-limiting aspects, the computer 22 can comprise a Flight Management System (not shown).

The set of aircraft systems 20 can reside within the cockpit 16, within the electronics and equipment bay (not shown), as well as in other locations throughout the aircraft 10. Such aircraft systems 20 can include but are not limited to an electrical system, an oxygen system, hydraulics or pneumatics system, a fuel system, a propulsion system, FMS, flight controls, audio/video systems, an Integrated Vehicle Health Management (IVHM) system, and systems associated with the mechanical structure of the aircraft 10. As discussed in more detail herein, in aspects, the set of aircraft systems 20 can include a flight recorder system 21.

The computer 22 can be operably coupled to the set of aircraft systems 20 and it is contemplated that the computer 22 can aid in operating the set of aircraft systems 20 and can receive information from the set of aircraft systems 20. The computer 22 can also be connected with other controllers or computers of the aircraft 10.

The computer 22 can include memory 26, the memory 26 can include Random Access Memory (RAM), Read-Only Memory (ROM), flash memory, or one or more different types of portable electronic memory, such as discs, Digital Versatile disks (DVD), Compact Disc-Read-Only Memory (CD-ROMs), etc., or any suitable combination of these types of memory. The computer 22 can include one or more controller modules or processors 28, which can be running any suitable programs. It will be understood that the computer 22 can include or be associated with any suitable number of individual microprocessors, power supplies, storage devices, interface cards, auto flight systems, flight management computers, controller modules, and other standard components and that the computer 22 can include or cooperate with machine executable code, any number of software (also sometimes called "firmware") programs (e.g., flight management programs), or other instructions designed to carry out the various methods, process tasks, calculations, and control/display functions necessary for operation of the aircraft 10. While not illustrated, it will be understood that any number of sensors or other systems can also be communicatively or operably coupled to the computer 22 to provide information thereto or receive information therefrom.

The flight recorder system 21 can include a set of fixed aircraft components, such as a set of line-replaceable units (LRUs) 31 which can define networking end nodes (also referred to as "end stations" and "end systems"), or modular components of the aircraft 10. The LRUs 31 can include respective control modules and be configured to operate according to a particular operation, interoperability, or form factor standards, such as those defined by ARINC664 series or Mil-Std-1553B, standards, for example. In the exemplary aspects illustrated, the aircraft computer 22 can be positioned near the nose or cockpit of the aircraft 10 while the LRUs 31 can be positioned throughout the aircraft 10. The aircraft computer 22 and LRUs 31 can be configured to be communicatively coupled by way of a data communication network 12. The data communication network 12 can comprise a series of data transmission pathways 13, including network bridges or switches (not shown). The data transmission pathways 13 can include a physical connection between the respective components or end nodes of the network 12 such as the computer 22 and LRUs 31. In non-limiting aspects, the physical connection can comprise a wired connection such as Ethernet, or can include wireless transmission connections including, but not limited to, WiFi (e.g. 802.11 networks), Bluetooth, and the like. Collectively, the aircraft computer 22, LRUs 31, data transmission pathways 13, and network switches can form the avionics data network for the aircraft 10.

The LRUs 31 can include, for example, entirely contained systems, sensors, instruments, cameras, recorders, processors, or other auxiliary equipment to manage or operate flight recorder functions. At least a set of LRUs 31 can, for example, generate data, which can be modified, computed, or processed prior to, or in preparation for, packaging the data into data frames to be transmitted over the avionics data network by way of the data transmission pathways 13. In non-limiting aspects another set of LRUs 31 can consume the data transmitted over the avionics data network. In some instances, the aircraft computer 22 or LRU 31, or both, can operate to generate or consume data, or both. As used herein, "consume," "consuming," or "consumption" of data will be understood to include, but is not limited to, performing or executing a computer program, routine, calculation, analysis, function, or process on at least a portion of the data, storing the data in memory, or otherwise making use of at least a portion of the data.

The communication link 24 can be communicably coupled to the computer 22 or other control modules or processors of the aircraft to transfer information to and from the aircraft 10. It is contemplated that the communication link 24 can be a wireless communication link and can be any variety of communication mechanism capable of wirelessly linking with other systems and devices and can include, but is not limited to, satellite uplink, SATCOM internet, very high frequency (VHF) Data Link (VDL), ACARS network, Automatic Dependent Surveillance-Broadcast (ADS-B), Wireless Fidelity (WiFi), WiMax, 3G wireless signal, Code Division Multiple Access (CDMA) wireless signal, Global System for Mobile communication (GSM), 4G wireless signal, Long Term Evolution (LTE) signal, 5G wireless signal or any combinations thereof. It will also be understood that the particular type or mode of wireless communication is not critical to the disclosure, and later-developed wireless networks are certainly contemplated as within the scope of the current disclosure. Further, the communication link 24 can be communicably coupled with the computer 22 through a wired link without changing the scope of the aspects as described herein. Although only one communication link 24 has been illustrated, it is contemplated that the aircraft 10 can have multiple communication links 24 communicably coupled with the computer 22. Such multiple communication links can provide the aircraft 10 with the ability to transfer information to or from the aircraft 10 in a variety of ways.

Figure 2:
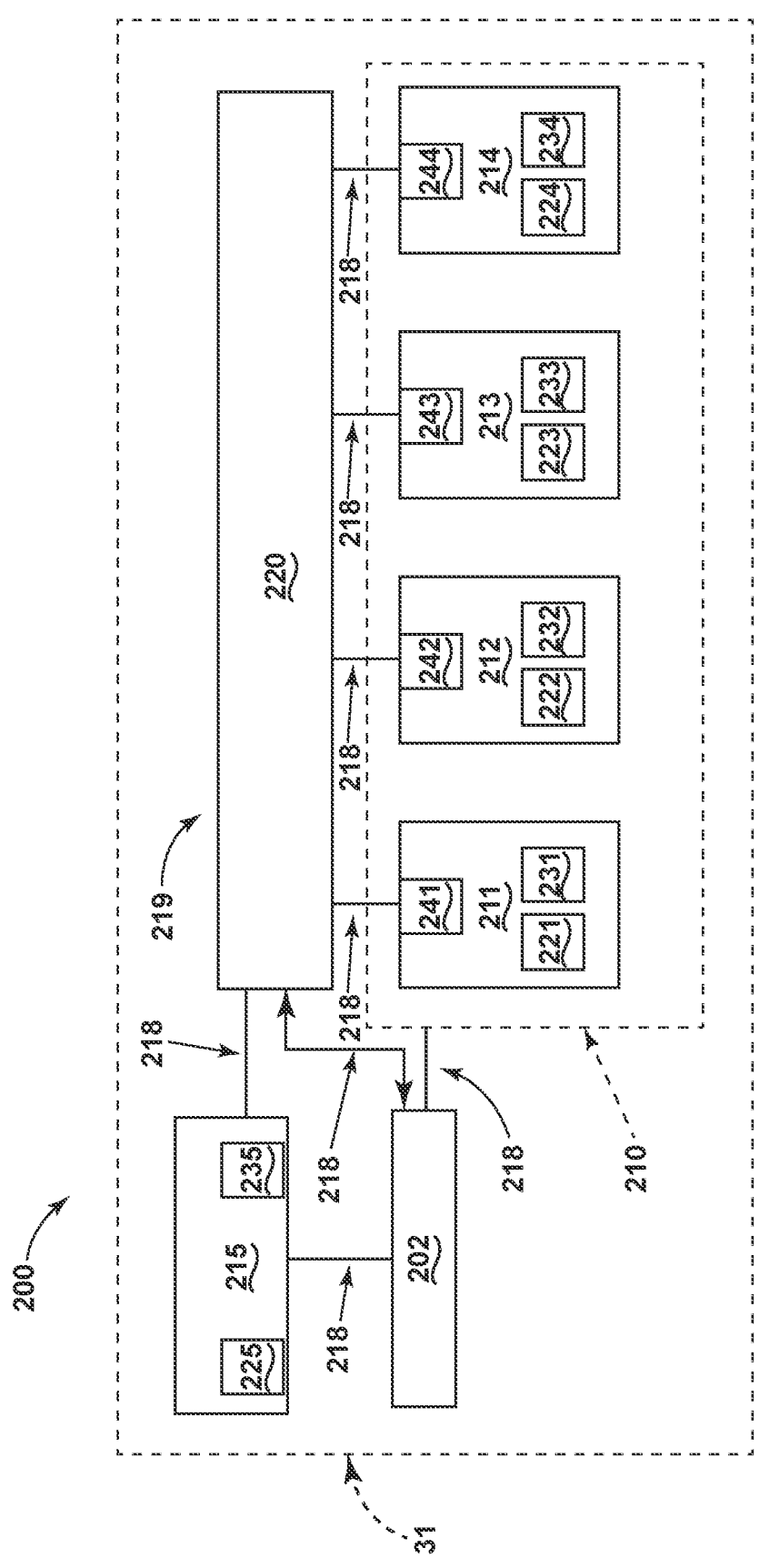
FIG. 2 is a block diagram of a flight recorder system that can be utilized with the aircraft and ground system of FIG. 1, in accordance with aspects described herein.

FIG. 2 illustrates a functional block diagram of a non-limiting aspect of a flight recorder system 200. The flight recorder system 200 can include the LRU 31 comprising a set of flight recorder modules (FRM) 210. As depicted, in some aspects, the set of FRM 210 can include at least one of a cockpit voice recorder module (CVR) 211, a flight data recorder module (FDR) 212, and a data analytics module (DA) 213. In some aspects the set of FRM 210 can include a crash-survivable recorder module (CSR) 214. It is contemplated that in other aspects, the set of FRM 210 can optionally include any number of other FRM (not shown) directed to data collection and recording of other desired aircraft performance and operational data. It will be appreciated that, in non-limiting aspects, the set of FRM 210 can comprise individual LRUs. In other aspects the set of FRM 210 can be combined into fewer physical entities, for example by combining the respective functions of the FRM 210 onto one or more circuit card assemblies (not shown).

A resource controller module (RCM) 215 can be communicatively coupled, via a data communication network 219 comprising a switch fabric 220, and a set of communication links 218 to the set of FRM 210. The RCM 215 can also be communicatively coupled to a data bus (not shown) of the aircraft via a data bus interface 202. In non-limiting aspects, the data communications network 219 can comprise a data communications network of the flight recorder system 200. In other aspects, the data communications network 219 can additionally, or alternatively, comprise a data communications network of the aircraft 10. For example, in non-limiting aspects, the set of FRM 210 can comprise a CSR that is arranged as a separate LRU. In non-limiting aspects, another FRM 210, such as one or more of the CVR, FDR, or DA can be communicatively coupled to the CSR via the aircraft data communication network.

Each FRM 210 can include a respective local memory. For example, the CVR 211 can include a local CVR memory 221, the FDR 212 can include a local FDR memory 222, the DA 213 can include a local DA memory 223, and the CSR 214 can include a local CSR memory 224. In non-limiting aspects, each respective local memory 221, 222, 223, 224 can be arranged as a sharable memory. For example, each respective local memory 221, 222, 223, 224 can be configured to provide a uniform memory access (UMA), non-uniform memory access (NUMA), or cache-only memory architecture (COMA) access. The respective local memory 221, 222, 223, 224 can include Random Access Memory (RAM), Read-Only Memory (ROM), flash memory, or one or more different types of portable electronic memory, such as discs, Digital Versatile disks (DVD), Compact Disc- Read-Only Memory (CD-ROMs), etc., or any suitable combination of these types of memory.

Each FRM 210 can include a respective control module or processor. For example, the CVR 211 can include a CVR control module 231, the FDR 212 can include a FDR control module 232, the DA 213 can include a DA control module 233, and the CSR 214 can include a CSR control module 234. Each respective control module 231, 232, 233, 234 can be configured to run any suitable programs or program code. While not shown, it will be understood that each FRM 210 can include or be associated with any suitable number of individual microprocessors, power supplies, storage devices, interface cards, controller modules, and other standard components and that the respective FRM 210 can include or cooperate with machine executable code, any number of software programs (e.g., data recording programs), or other instructions designed to carry out the various methods, process tasks, calculations, and control/display functions necessary for the intended operation of the respective FRM 210. The respective control module 231, 232, 233, 234 can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof. For example, in non-limiting aspects, the respective controller module 231, 232, 233, 234 can comprise a respective set of FPGA (not shown) having addressable memory-mapped registers.

Each FRM 210 can also comprise a respective set of input and output (I/O) ports communicatively coupled to the switch fabric 220. For example, the CVR 211 can include a set of CVR I/O ports 241, the FDR 212 can include a set of FDR I/O ports 242, the DA 213 can include a set of DA I/O ports 243, and the CSR 214 can include a set of CSR I/O ports 244. Each of the respective I/O ports 241, 242, 243, 244 can be communicatively coupled to the data communication network 219. In aspects, each respective I/O ports 241, 242, 243, 244 can comprise a memory-mapped I/O port.

In non-limiting aspects, the data communication network 219 can define a network mesh or switch fabric 220 comprising a set of communicatively coupled network switches or bridges (not shown) such as Ethernet switches. In non-limiting aspects, the data communication network 219 can be configured in accordance with time-sensitive network (TSN) schema to communicate data using standard methods for time synchronization and traffic management, allowing deterministic communication over a standard Ethernet network. The data communication network 219 can comprise any desired communication bus or bus topology that would enable aspects to operate as described herein. For example, in non-limiting aspects, the data communication network 219 can comprise a high-speed serial bus compliant with a Peripheral Component Interconnect Express (PCIe) schema. In such non-limiting aspects having a PCIe compliant point-to-point topology, the set of separate respective links 218 can communicatively couple each FRM 210 to the switch fabric 220 to enable full-duplex communication of data packets between any two end nodes (e.g., the FRM 210 or RCM 215), with no inherent limitation on concurrent access between multiple end nodes. In non-limiting aspects, the set of links 218 can communicatively couple one or more FRM 210 to the RCM 215, the switch fabric 220, data bus interface 202, the data bus (not shown) of the aircraft, various data acquisition devices (not shown) of the aircraft, or any combination thereof. The set of links 218 can comprise any one or more of serial links, parallel data bus links, or other conventional communication links. It will be understood that aspects employing a PCIe schema can be programmed to detect and configure the FRM 210 devices when communicatively coupled to the data communication network 219. It will be further understood that in some instances, the FRM 210 devices can comprise a "pre-configured" or default functionality or operation, and aspects can be programmed to automatically detect and re-configure the FRM 210 devices via the RCM 215 when communicatively coupled to the data communication network 219.

The RCM 215 can comprise a respective local memory 225 and a controller module 235. The RCM memory 225 can include Random Access Memory (RAM), Read-Only Memory (ROM), flash memory, or one or more different types of portable electronic memory, such as discs, Digital Versatile disks (DVD), Compact Disc-Read-Only Memory (CD-ROMs), etc., or any suitable combination of these types of memory. In some aspects, the RCM local memory 225 can be configured as a shareable memory.

The RCM 215 control module 235 can be configured to run any suitable programs or program code to enable aspects to operate as described herein. While not shown, it will be understood that each RCM 215 can include or be associated with any suitable number of individual microprocessors, power supplies, storage devices, interface cards, controller modules, and other standard components and that the respective RCM 215 can include or cooperate with machine executable code, any number of software programs (e.g., data recording programs), or other instructions designed to carry out the various methods, process tasks, calculations, and control/display functions necessary for the intended operation of the respective RCM 215. The RCM 215 can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof.

The RCM 215 can be communicatively coupled to a data bus or data communication network (not shown) of the aircraft 10 via a data bus interface 202. The flight recorder system 200 can receive or collect data from the data bus or data communication network of the aircraft 10 and provide the data to one or more of the FRM 210. For example, in non-limiting aspects the data can be provided via the RCM 215 or the switch fabric 220 or a combination thereof. In non-limiting aspects, the RCM 215 can receive or collect data from the data bus or data communication network of the aircraft 10 during a flight of the aircraft. For example, the RCM 215 can receive data from the data bus of the aircraft 10 that is indicative of a current phase or stage of a flight of the aircraft. In such aspects, the RCM 215 can be programmed to configure an operation of the switch fabric 220 based on the indicated phase or stage of a flight of the aircraft. Further, in such aspects, the RCM 215 can optionally be programmed to configure a first operation of at least one of the switch fabric 220 and a first FRM 210 based on a first phase of a flight, and to configure a second operation of at least one of the switch fabric 220 and the first FRM 210 based on a second phase of a flight. As used herein, the term "configure an operation" (such as a first operation or a second operation) can include "re-configuring an operation", for example in an instance where a particular FRM comprises a default operation or pre-configured function or operation. In some aspects, the flight recorder system 200 can receive commands from the computer 22 via the data bus or data communication network of the aircraft 10 to which it can respond. In some aspects, the flight recorder system 200 can provide data from one or more of the FRM 210 to the cockpit display 29.

The RCM 215 can also be communicatively coupled, via the data communication network 219, to the set of FRM 210. The RCM 215 can be configured to detect a FRM 210 connected to the switch fabric 220. In response to the detection of a particular FRM 210 connected to the switch fabric 220, the RCM 215 can be programmed to execute (e.g., via a "plug-and-play" process or executable program code) to configure an operation of the detected FRM 210. It will be appreciated that because the configuration of the operation of the FRM 210 by the RCM 215 can be based on the detection of the FRM 210 by the RCM 215, the operation of the FRM 210 can be dynamically configured by the RCM 215 during a flight of the aircraft, and need not necessarily be done only during a pre-flight or post-flight scheduled maintenance The detection by the RCM 215 of a particular FRM 210 connected to the switch fabric 220 can further include a determining, by the RCM 215, of the detected FRM 210 type. For example, in the event the RCM 215 detects that a particular FRM 210 has been communicatively coupled to the switch fabric 220, the RCM 215 can be programmed to determine whether the detected FRM 210 is one of a CVR 211, FDR 212, DA 213, CSR 214, or some other type of FRM 210. In still other aspects, the detection or determination of a particular FRM 210 connected to the switch fabric 220 can further include a determining, by the RCM 215 of a count or number of the available respective I/O ports 241, 242, 243, 244 of the detected FRM 210. In an aspect, based on the detection of the particular detected FRM 210 communicatively coupled to the switch fabric 220, and the determination of the detected FRM 210 type and number of available memory-mapped I/O ports 241, 242, 243, 244 of the detected FRM 210, the RCM 215 can be further programmed to dynamically configure the operation of the detected FRM 210. Additionally, the RCM 215 can be programmed to configure an operation of the switch fabric 220 based on the detected FRM 210 type. In other non-limiting aspects, the RCM 215 can be further programmed to direct or command the detected particular FRM 210 to load software or firmware (e.g., FPGA firmware) stored in local non-volatile memory (e.g., flash memory) of the detected particular FRM 210.

In some aspects, the respective local memory 221, 222, 223, 224 of each FRM 210 communicatively coupled to the data communication network 219 can be readable by the RCM 215 via the switch fabric 220. Additionally, in non-limiting aspects, at least some data in the respective local memory 221, 222, 223, 224 of each FRM 210 can be shareable with other FRMs 210 communicatively coupled to the data communication network 219. In non-limiting aspects, the RCM 215 can be programmed to configure the switch fabric 220 to enable access by each FRM 210 to any memory-mapped computing resource of the other FRMs

210, such as the respective local memory 221, 222, 223, 224, the respective I/O ports 241, 242, 243, 244, or combination thereof. In this way, the respective local memory 221, 222, 223, 224, or respective ports I/O 241, 242, 243, 244 of a first FRM 210 can be accessible by a second FRM 210 without a cooperation or participation of the respective control module 231, 232, 233, 234 of the first FRM 210. For example, in non-limiting aspects, the FRM 210 can include a DA 213 configured to analyze data received from the respective local memory of the at least one of the CVR 211 and FDR 212 during a flight of the aircraft, using the DA control module 233 without need of cooperation with the respective control module 231, 232 of the CVR 211 and FDR 212.

FIG. 3 illustrates a non-limiting example of a method 300 of operating the flight recorder system 200 of an aircraft 10. The method 300 can be performed while the aircraft 10 is in-flight, pre-flight (e.g., prior to executing a flight plan), or post-flight (e.g., subsequent to a flight). Although described in terms of a flight recorder system 200, it will be appreciated that the method 300 can be applied to any suitable avionics device configured to save data to a memory and communicate with any other suitable other avionics device.

The flight recorder system can include a first FRM 210 having a first local memory 221-224 and a first set of memory-mapped I/O ports 241-244 and a second FRM 210, having a second local memory 221-224 and a second set of memory-mapped I/O ports 241-244. In non-limiting aspects, the first FRM 210 can include at least one of a CVR 211, a FDR 212, a DA 213, and a CSR 214. In non-limiting aspects, the second FRM 210 can include at least one of a CVR 211, a FDR 212, a DA 213, and a CSR 214. It is contemplated that in other aspects, first FRM 210, or the second FRM 210, or both, can optionally include any number of other FRM 210 configured for data collection or recording of other desired aircraft performance and operational data. An RCM 215 can be communicatively coupled, via a data communication network 219 comprising a switch fabric 220, to the first FRM 210 and second FRM 210. The RCM 215 can also be communicatively coupled to a data bus of the aircraft (not shown) via a data bus interface 202.

The method 300 can include communicatively coupling the RCM 215 to the switch fabric 220 of a data communications network 219, and communicatively coupling the first FRM 210 and second FRM 210 to the switch fabric, at 320. In a non-limiting aspect, the data communications network 219 can comprise a data communications network 219 of the flight recorder system 200. In other aspects, the data communications network 219 can additionally, or alternatively, comprise a data communications network of the aircraft 10. For example, in non-limiting aspects, one of the first FRM 210 and second FRM 210 can comprise a CSR 214 that is arranged a separate LRU. In such aspects, the other of the first FRM 210 and second FRM 210 can be communicatively coupled to the CSR 214 via the aircraft data communication network 219. In still other aspects, the first FRM 210 can be communicatively coupled to other discrete sensors or devices, such as but not limited to, tachometers, strain gauges and the like, to receive data therefrom. The method 300 includes, at 325, detecting by the RCM 215, the first FRM 210, and at 330, reading, by the RCM 215 at least one of the first local memory and the first memory-mapped I/O ports of the first FRM 210. The detecting by the RCM, of the first FRM at 325 can include at least one of a determination of the first FRM 210 type and a number of I/O ports of the first FRM 210.

Next, the method 300 includes configuring, by the RCM 215, an operation of the first FRM 210, at 335, providing data to the first FRM 210, at 340, and saving a first portion of the data to the local memory of the first FRM, at 345. In various non-limiting aspects, the data can be provided to the first FRM 210 via the RCM 215, the switch fabric 220, the data communication network 219, other devices or sensors, or any combination thereof. The method 300 can also include providing, by the first FRM 210, a second portion of the data to the second FRM 210 at 350.

In non-limiting aspects, the method 300 can include instructing, by the RCM 215, the first FRM 210 to load firmware stored in a local memory 221-224, at 355, and at 360, configuring the switch fabric 220 to enable the first FRM 210 to access the local memory 221-224 of the second FRM 210. In aspects, the configuring the switch fabric at 360 can optionally be done during a flight of the aircraft.

Non-limiting aspects of the method 300 can further include configuring, by the RCM 215, an operation of the switch fabric 220 based on the determined FRM 210 type, at 365. The configuring, by the RCM 215, of an operation of the switch fabric 220 based on the determined FRM 210 type, at 365 can optionally be done during a flight of the aircraft.

The sequences depicted are for illustrative purposes only and is not meant to limit the method 300 in any way as it is understood that the portions of the method can proceed in a different logical order, additional or intervening portions can be included, or described portions of the method can be divided into multiple portions, or described portions of the methods can be omitted without detracting from the described method. For example, the method 300 can include various other intervening steps. The examples provided herein are meant to be non-limiting.

It is contemplated that aspects of this disclosure can be advantageous for use over conventional systems or methods for configuring and operating a flight recorder. Aspects of this disclosure reduce workload of a pilot or maintenance crew in configuring a flight recorder. For example, when adding, installing or reconfiguring a flight recorder module in-flight. This is particularly advantageous in the case of Single Pilot Operations (SPO) or Reduced Crew Operations (RCO).

It is further contemplated that aspects of this disclosure can advantageously provide a more adaptable structure over conventional flight recorders and systems. Aspects as described herein can more readily support multiple configurations of flight recorders modules using a standardized structure, for example, using a common chassis and common backplane. Aspects as described herein can thus advantageously provide a more scalable flight recorder system as compared to conventional systems.

It is additionally contemplated that aspects as described herein more readily enable dynamic configuration of a flight recorder system during a flight than conventional flight recorder systems. For example, flight recorder modules can be added and configured for operation during a flight of the aircraft. Alternatively, flight recorder modules can optionally be configured for different operations based on a phase of flight of the aircraft To the extent not already described, the different features and structures of the various embodiments can be used in combination with each other as desired. That one feature is not illustrated in all of the embodiments is not meant to be construed that it may not be included, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure may also be embodied in any permutation of aspects of the disclosure, including but not limited to the following technical solutions as defined in the enumerated aspects:

A flight recorder system of an aircraft, comprising: a resource controller module (RCM) communicatively coupled, via a data communication network defining a switch fabric, to a set of flight recorder system modules (FRM); each FRM comprising a respective control module, a respective local memory, and a respective set of input and output (I/O) ports communicatively coupled to the switch fabric wherein the RCM is configured to detect a respective FRM coupled to the switch fabric, and based on the detection, configure an operation of the FRM, and wherein the respective local memory of the FRM is readable by the RCM, and shareable with the other FRMs via the switch fabric.

The flight recorder system of the preceding clause, wherein each FRM is dynamically configurable by the RCM.

The flight recorder system of any preceding clause, wherein the RCM is configured to instruct the FRM to load software from a local memory.

The flight recorder system of any preceding clause, wherein the respective local memory includes at least one of a random-access memory (RAM), a memory-mapped I/O port, and a register.

The flight recorder system of any preceding clause, wherein the local memory of a first FRM is accessible by a second FRM without a cooperation of the respective processor of the first FRM.

The flight recorder system of any preceding clause, wherein the RCM is programmed to configure the switch fabric to enable the control module of the second FRM to access the local memory of the first FRM.

The flight recorder system any preceding clause, wherein the detection of the respective FRM by the RCM includes at least one of a determination of the FRM type, and a number of I/O ports of the respective FRM.

The flight recorder system of any preceding clause, wherein the RCM is further configured to configure an operation of the switch fabric based on the determined FRM type.

The flight recorder system of any preceding clause, wherein an operation of at least one of the switch fabric and the FRM is configurable by the RCM during a flight of the aircraft.

The flight recorder system of any preceding clause, wherein the RCM is communicatively coupled to a data bus of the aircraft, and is configured to receive data therefrom.

The flight recorder system of any preceding clause, wherein the data received by the RCM is indicative of a current phase of flight of the aircraft, and wherein the RCM is further programmed to configure an operation of the switch fabric based on the indicated phase of flight of the aircraft.

The flight recorder system of any preceding clause, wherein the RCM is further programmed to configure a first operation of at least one of the switch fabric 220 and a first FRM during a first phase of a flight of the aircraft, and to configure a second operation of at least one of the switch fabric and a first FRM during a second phase of a flight of the aircraft.

The flight recorder system of any preceding clause, wherein the set of FRM includes a data analytics module (DA) and at least one of a cockpit voice recorder module (CVR) and a flight data recorder module (FDR), and wherein the DA is configured to analyze data received from the respective local memory of the at least one CVR and FDR during a flight of the aircraft.

The flight recorder system of any preceding clause, wherein the set of FRM includes at least one of a CVR, a FDR, a DA, and a crash-survivable recording subsystem.

A method of operating a flight recorder system of an aircraft, the flight recorder system including a first flight recorder module (FRM) having a first local memory and a first set of memory-mapped I/O ports and a second FRM, having a second local memory and a second set of memory-mapped I/O ports, comprising: communicatively coupling a resource control module (RCM) to a switch fabric; communicatively coupling the first FRM and second FRM to the switch fabric; detecting, by the RCM, the first FRM; reading, by the RCM, at least one of the first local memory and the first memory-mapped I/O ports of the first FRM; configuring, by the RCM, an operation of the first FRM; providing data to the first FRM; saving a first portion of the data to the local memory of the first FRM; retrieving, by the second FRM, a second portion of the data from the first FRM to the second FRM.

The method of any preceding clause, further comprising instructing, by the RCM, the FRM to load software from a local memory.

The method of any preceding clause, further comprising configuring the switch fabric to enable the first FRM to access the local memory of the second FRM.

The method of any preceding clause, wherein the configuring, by the RCM, an operation of the first FRM is during a flight of the aircraft.

The method of any preceding clause, wherein the detecting by the RCM, of the first FRM includes at least one of a determination of the first FRM type and a number of I/O ports of the first FRM.

The method of any preceding clause, further comprising configuring, by the RCM, an operation of the switch fabric based on the determined FRM type.

What is claimed is:

1. A method of operating a flight recorder system of an aircraft, the flight recorder system including a first flight recorder module (FRM) having a first local memory and a first set of memory-mapped I/O ports and a second FRM having a second local memory and a second set of memory-mapped I/O ports, comprising:

communicatively coupling a resource control module (RCM) to a switch fabric;

communicatively coupling the first FRM and second FRM to the switch fabric;

detecting, by the RCM, the first FRM;

reading, by the RCM, at least one of the first local memory and the first set of memory-mapped I/O ports of the first FRM;

configuring, by the RCM, an operation of the first FRM;

providing data to the first FRM;

saving a first portion of the data to the local memory of the first FRM;

configuring, by the RCM, the switch fabric to enable the control module of the second FRM to access the local memory of the first FRM; and retrieving, by the second FRM, a second portion of the data from the first local memory of the first FRM;

wherein the first and second FRM respectively comprise one of a cockpit voice recorder (CVR), a flight data recorder (FDR), or a crash-survivable recorder (CSR).

2. The method of claim 1, further comprising instructing, by the RCM, the FRM to load software from a local memory.

3. The method of claim 1, further comprising configuring the switch fabric to enable the first FRM to access the local memory of the second FRM.

4. The method of claim 1, wherein the configuring, by the RCM, an operation of the first FRM is during a flight of the aircraft.

5. The method of claim 1, wherein the detecting by the RCM, of the first FRM includes at least one of a determination of a first FRM type and a number of I/O ports of the first FRM.

6. The method of claim 5, further comprising configuring, by the RCM, an operation of the switch fabric based on the determined FRM type.

* * * * *